United States Patent
Manku (10) Patent No.: US 8,847,834 B2
(45) Date of Patent: *Sep. 30, 2014

(54) METHOD AND APPARATUS FOR GENERATING DEDICATED DATA CHANNELS IN BACKSCATTER RFID SYSTEMS USING BAND-PASS MODULATION

(75) Inventor: Tajinder Manku, Waterloo (CA)

(73) Assignee: Tag-Comm Inc., Waterloo (CA)

( * ) Notice: Subject to any disclaimer, the term of this patent is extended or adjusted under 35 U.S.C. 154(b) by 249 days.

This patent is subject to a terminal disclaimer.

(21) Appl. No.: 13/470,472

(22) Filed: May 14, 2012

(65) Prior Publication Data

US 2013/0300619 A1  Nov. 14, 2013

(51) Int. Cl.
*H01Q 9/00* (2006.01)
(52) U.S. Cl.
USPC .......................................... 343/750; 343/745
(58) Field of Classification Search
USPC ................... 235/439; 343/745, 750
See application file for complete search history.

(56) References Cited

FOREIGN PATENT DOCUMENTS

| EP | 0 851 599 A1 | 7/1998 |
|---|---|---|
| EP | 0 899 682 A2 | 3/1999 |
| EP | 1 646 155 A1 | 4/2006 |

OTHER PUBLICATIONS

International Search Report and Written Opinion, Mailed Feb. 13, 2013, for Corresponding PCT International Patent Application No. PCT/CA2012/000570.
Gay, et al., "An Ultra-Low-Power Sensor Interface Built Around a Reconfigurable Incremental Sigma-Delta Modulator for Sensor Networks Employing Electromagnetic Backscatter", IEEE Circuits and Systems, 2008.

*Primary Examiner* — Hoang V Nguyen
(74) *Attorney, Agent, or Firm* — Gowling Lafleur Henderson LLP (57) ABSTRACT

An antenna apparatus for backscattering an incoming radio frequency (RF) signal includes an antenna for backscattering the incoming RF signal in accordance with a reflection coefficient characteristic of the antenna. A variable impedance circuit includes an output electrically connected to the antenna. A band-pass delta sigma modulator is coupled to the variable impedance circuit and digitally controls the output of the variable impedance circuit, such that the reflection coefficient of the antenna is adjusted based on the digitally controlled output of the variable impedance circuit. In an RFID network, the apparatus and method reduces the effect of DC offset in the reader device and the effects of the reader device's phase noise, while allowing for complex modulations.

15 Claims, 7 Drawing Sheets

METHOD AND APPARATUS FOR GENERATING DEDICATED DATA CHANNELS IN BACKSCATTER RFID SYSTEMS USING BAND-PASS MODULATION

FIELD OF THE INVENTION

The present invention relates generally to a method and apparatus for generating dedicated data transmission channels in backscatter radio frequency communication networks using band-pass signal modulation.

BACKGROUND OF THE INVENTION

Radio Frequency Identification (RFID) systems are commonly used to locate and track items in a near-field communication network including a reader device and at least one wireless terminal, or tag. Energized time-varying electromagnetic radio frequency (RF) waves, which comprise the carrier signal, are transmitted from the reader to the tags in a given RFID network or system. Tags use backscatter technology to reflect the reader's RF signal back to the reader, modulating the signal to encode and transmit data.

Figure 1:
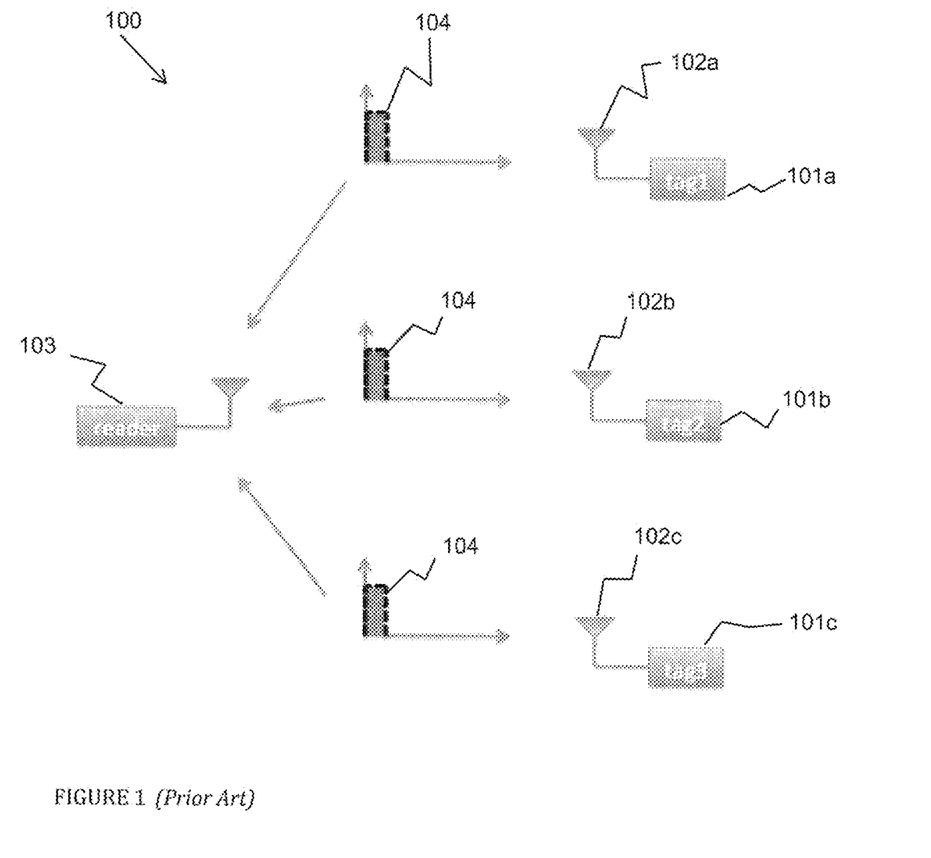
FIG. 1 shows a prior art RFID system in which data transmission from tag to reader is performed on a same frequency channel.

FIG. 1 depicts a prior art RFID system in which data transmission from tags 101a-c to reader device 103 is performed on a same frequency channel or spectrum 104. Using the established backscattering technology, each of the plurality of tags typically in the RFID system or network sends RF signals on the same backscattered carrier signal. Hence, the backscattered RF signals from each tag overlap those of other tags within the same RF spectrum associated with that given reader device/RFID network.

As a consequence, tag collision in RFID systems occur when the multiple tags are energized by the same RFID reader device, and simultaneously reflect their respective, overlapping signals back to the reader using the given frequency channel. Thus the tag collision problem is exacerbated whenever a large number of tags must be read together in the same RF field. The reader is unable to differentiate these signals when the simultaneously generated signals collide. The tag collisions confuse the reader, generate data transmission errors, and generally reduce data throughput within the RFID system or network.

Various systems have been proposed to isolate individual tags. For example, in one technique aimed at reducing collision errors, when the reader recognizes that tag collision has taken place, it sends a special "gap pulse" signal. Upon receiving this signal, each tag consults a random number counter to determine the interval to wait before sending its data. Since each tag gets a unique number interval, the tags send their data at different times. The adverse impact on overall RFID system performance, in terms of data throughput rate, however, still exists.

Modulating the signal received by the tag and re-radiating the modulated signal backscattered to the reader device is known, using such signal modulation schemes, such as phase shift keying (PSK) and amplitude shift keying (ASK), where the tag changes its reflection coefficient by changing the impedance match between states. However, the adverse effects of tag collisions resulting from overlapping backscattered signals on a given frequency channel still remain.

Moreover, especially pertinent in the context of high frequency RF signals is the effect of the DC offset in the reader device and the effects of the reader's phase noise.

The design of backscattering tag terminals in RFID networks involves some further special challenges. The backscattered tag signal is not the only reflected signal present; in a single-antenna system there is usually an even larger signal due to unintended reflections from the transmitting antenna of the reader device to various surrounding objects. The unwanted reflected signals mix with the local oscillator signal in the reader device; since they are not (usually) modulated they produce DC offsets: large DC voltages output from the mixer. Fortunately, if the wanted signal does not contain much information near DC, which will be the case as long as the tag symbols are chosen to ensure frequent transitions in tag state even when the data has long strings of 1's or 0's, it may straightforward to filter out this offset. However, this is generally not preferred. The resulting large swings in the mixer output are harder to filter out, and make it hard to see any reflection from the tag until the receiver has had a few microseconds to recover.

The above problem may be ameliorated by using separate transmit and receive antennas (a bistatic configuration): in this case instead of the reflected signal from the (single) antenna, the receiver must only deal with the portion of the transmitted signal that impinges on the receive antenna, typically much smaller than the reflected signal. Isolation of around 40 dB is obtained with the large bistatic antennas commonly used with commercial readers, which represents 20-25 dB better than the return loss from a single antenna. However, the use of a pair of antennas adds cost, complexity, and increased space requirements to the reader. An adaptive antenna tuner or nuller to reduce the reflections from a single (monostatic) antenna may alternatively be used, but this solution again involves added expense and complexity.

Oscillators, for instance as used in a reader device, do not produce a perfectly pure carrier signal, as both the phase and amplitude of the signal can vary. The phase noise can be converted into amplitude noise in the received signal when the large fixed reflection mixes with the local oscillator. Phase noise is normally highest at frequencies very close to the frequency of the carrier signal, which is converted to near DC upon mixing. To reduce phase noise effects, it is desirable to use a relatively narrow filter that passes only the frequencies containing the wanted signal from the tags, and to use the highest, or band-pass, tag modulating frequency as practical; however, this restricts the types of modulations and the type of data streams that may be used.

SUMMARY OF THE INVENTION

Provided is an antenna apparatus for backscattering an incoming radio frequency (RF) signal. The antenna apparatus comprises an antenna for backscattering the incoming RF signal in accordance with a reflection coefficient characteristic of the antenna, a variable impedance circuit having an output electrically connected to the antenna; and a band-pass delta sigma ($\Delta\Sigma$) modulator coupled to the variable impedance circuit and digitally controlling the output of the variable impedance circuit, wherein the reflection coefficient ($\Gamma$) of the antenna is adjusted based on the digitally controlled output of the variable impedance circuit.

The antenna apparatus, in one embodiment, may comprise part of a tag terminal electromagnetically coupled to a reader device within a radio frequency identification (RFID) system wherein clocking of the band-pass delta sigma modulator is generated via a clock circuit within the tag terminal.

In an alternate configuration, the antenna apparatus may comprise part of a tag terminal electromagnetically coupled to a reader device within a radio frequency identification (RFID) system wherein clocking of the band-pass delta sigma modulator is generated based on a carrier signal frequency of the reader device, frf, divided by L, where L represents a positive numerical value.

In another embodiment of the antenna apparatus, an output of the band-pass delta sigma modulator switches the output of the variable impedance circuit between two states to adjust the reflection coefficient.

In another embodiment, the antenna apparatus may comprise part of a tag terminal electromagnetically coupled to a reader device within a radio frequency identification (RFID) system, wherein an input signal applied to the band-pass delta sigma modulator consists of a complex modulation signal offset from an incoming RF signal from the reader device by $+/-\omega_o$, where $\omega_o$ represents a frequency offset from the incoming RF signal. The complex modulation signal may consist of any one of a GMSK, QPSK, nPSK, nQAM, and an OFDM signal.

In yet another embodiment of the antenna apparatus, the digitally controlled output is generated from an in-phase-quadrature (IQ) up-converted signal input to the band-pass delta sigma modulator.

The antenna apparatus, in another embodiment, may comprise part of a tag terminal electromagnetically coupled to a reader device within a radio frequency identification (RFID) system wherein generation of data from the IQ up-conversion modulator is based on a clock circuit internal to the tag terminal.

In an alternate configuration, the antenna apparatus may comprise part of a tag terminal electromagnetically coupled to a reader device within a radio frequency identification (RFID) system wherein generation of data from the IQ up-conversion modulator is based on a clock circuit using a carrier signal frequency of the reader device, frf, divided by M, where M represents a positive numerical value.

In yet another embodiment, the up-conversion modulator up converts data around fs divided by 4, where fs is the sampling frequency of the band-pass delta sigma modulator.

In another configuration, input data provided to the up-conversion module may consist of one of a GMSK, QPSK, nPSK, nQAM, and an OFDM signal format.

BRIEF DESCRIPTION OF THE DRAWINGS

The invention will now be described by way of example only with reference to the following drawings in which.

DETAILED DESCRIPTION

The term modulation as used herein refers to the process by which the radio frequency identification (RFID) wireless terminal, or tag, changes the carrier radio frequency (RF) signal of the reader antenna to convey information. For instance, in phase modulation, data being transmitted from the reader device to the tag is encoded in changes in the phase of the carrier wave sent out by the RFID reader device.

Figure 2:
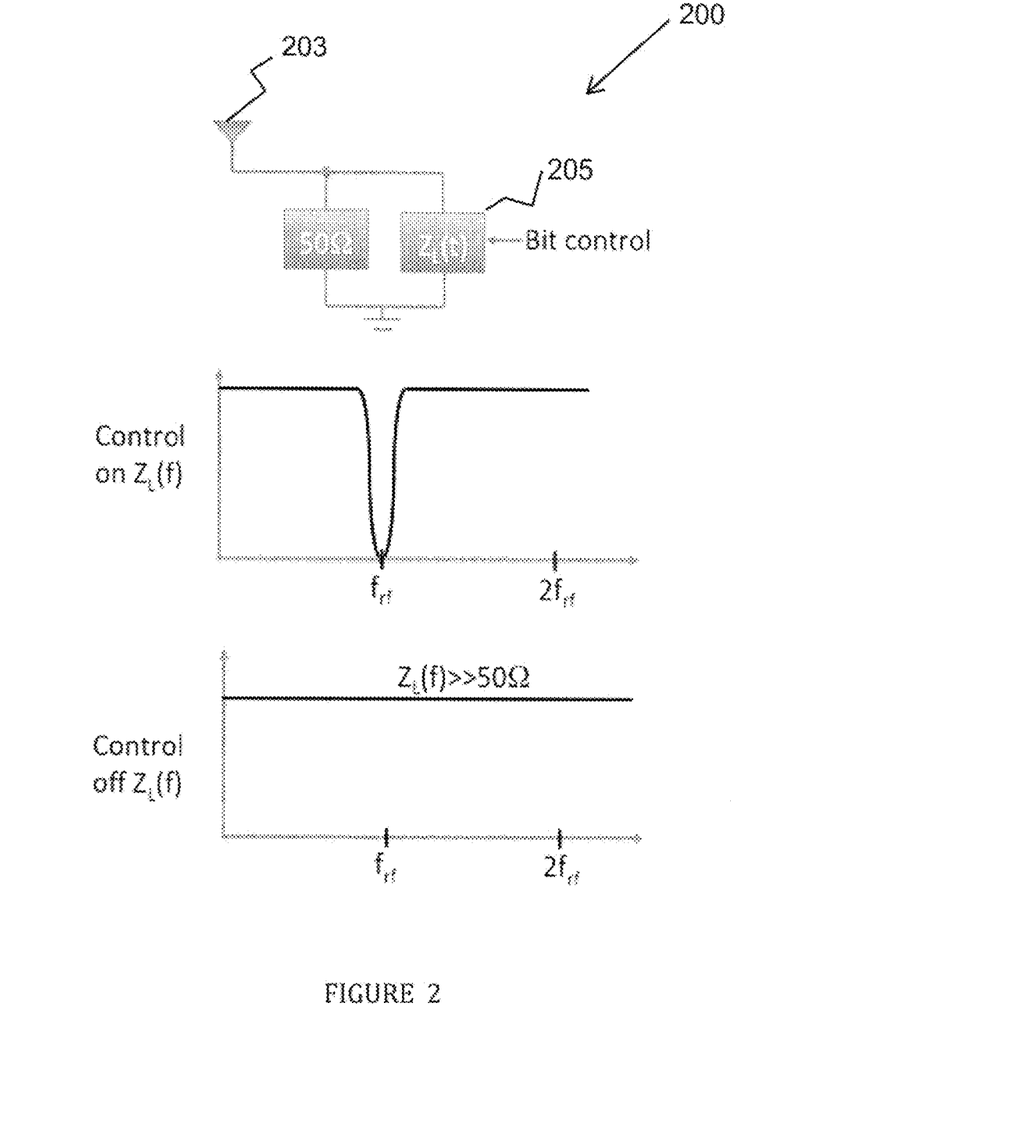
FIG. 2 shows, in one embodiment, an apparatus for generating the varying impedance for backscattering.

FIG. 2 shows, in one embodiment, an antenna apparatus 200 in a wireless communication system, such as a radio frequency identification (RFID) communication network, which may be passive or semi-passive, for generating a varying impedance 205 at antenna 203 for backscattering an incoming radio frequency (RF) signal, such as from a reader device of the RFID network. Antenna 203, which may be part a tag terminal of the RFID communication network, backscatters the incoming reader device, or carrier, RF signal in accordance with its reflection coefficient (Γ) characteristic.

Still with regard to FIG. 2, illustrated is one embodiment for designing the varying impedance circuit 205 used to generate the backscattering wave from the antenna 203. Here the impedance $Z_L$ is switched between two states depending on the control bit. When the control bit is band $Z_L$ looks like zero impedance at $f_{rf}$, hence the backscattering $\Gamma(f_{rf})=1$. Note that $Z_L$ is designed to have a band impedance other than $f_{rf}$. At $2f_{rf}$ the impedance helps to reduce folding of $2f_{rf}$. When the control is band, $Z_L \gg 50$ ohms. Therefore $\Gamma=0$, and no signal is back scattered.

The varying impedance can yet further be designed to produce a phase shift in the backscattered wave. That is, $$\Gamma_i = \alpha e^{j\phi_i}$$

where φ has two states, $\phi_1$ and $\phi_2$ and α is a constant The back scattering impedance is then given by:

$$Z_l = \frac{Z_s(1 + \alpha e^{j\phi_i})}{(1 - \alpha e^{j\phi_i})}$$

where $Z_L$ has two states, $Z_1$ and $Z_2$. Here $\phi_i$ can be designed to have states $\phi_1=0°$ and $\phi_2=180°$. Here, $Z_s$ is the impedance of the antenna. Since the antenna impedance adjusts given its environment, such as if the antenna is in front of a metal object, the effective Γ is simply rotated and scaled. This can be illustrated by assuming Zs changes to $Z_s\beta \exp(j\phi)$ where β is the scaling factor and φ is the rotation. Therefore, Γ changes to:

$$\Gamma = \frac{Z - Z_s\beta e^{j\varphi}}{Z + Z_s\beta e^{j\varphi}}$$

Or, $$\Gamma = \frac{Z\beta^{-1}e^{-j\varphi} - Z_s}{Z\beta^{-1}e^{-j\varphi} - Z_s}$$

Given this, a change in $Z_s$ results in scaling and rotating Z by $\beta^{-1}$ and $-\varphi$, respectively. In this complex modulation scheme, phase changes in $\Gamma$ rather than amplitude changes may be utilized.

In an embodiment, a one filter or more filters may be in the variable impedance circuit to filter out of band noise output from the high-pass, or band-pass, delta sigma modulator.

Figure 3:
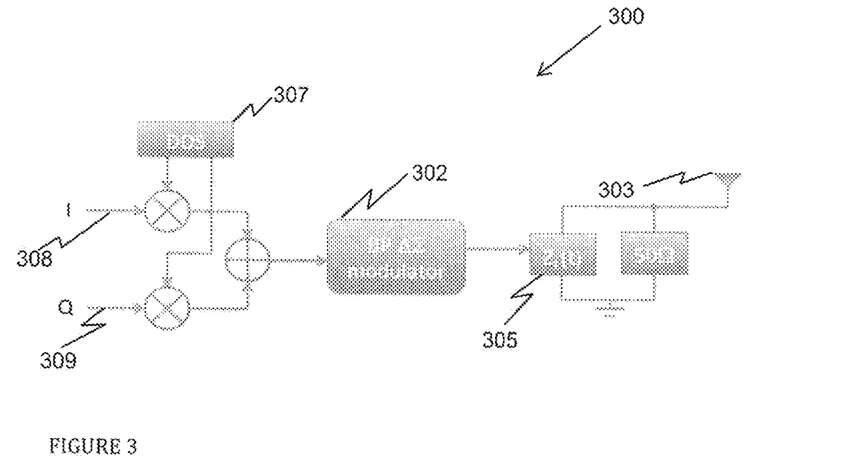
FIG. 3 shows, in one embodiment, an apparatus for generating an IQ signal offset by the frequency of a digital signal source such as a Direct Digital Synthesizer.

FIG. 3 shows how In-Phase-Quadrature (IQ) signals may used to generate complex waveforms via the band-pass delta sigma ($\Delta\Sigma$) modulator using $\Gamma$-$\Delta\Sigma$ scheme 300; the complex modulation method and apparatus for band-pass delta sigma modulation will be referred to, and denoted herein, as the "$\Gamma$-$\Delta\Sigma$ scheme". Here the signal to the mixers is IQ up-converted by a direct digital synthesizer (DDS) 307, or a clock, at fs/4. The signals are then applied to band pass delta sigma modulator 302. Band-pass delta sigma ($\Delta\Sigma$) modulator 302 is applied at a sample rate fs to generate the complex modulation signal. As referred to herein, the band-pass delta sigma modulator generates an output bit stream that represents the input data from with the range of:

fs/4−BW/2 to fs/4+BW/2 where fs represents the sampling frequency of the band-pass delta sigma modulator, and BW represents a predefined bandwidth for which the band-pass delta sigma modulator is designed. The complex IQ backscattered signal of the tag antenna will be around frf+/−fs/4, where frf is the frequency of the reader device signal in the RFID network. Since the output bit stream is offset from the frequency of the reader device signal by fs/4, this both reduces the effect of DC offset in the reader device, and reduces the effects of the reader device's phase noise. In this fashion, any type of complex modulation may be applied, including a Gaussian minimum shift keying (GMSK), nPSK, quadrature phase shift keying (QPSK), nQAM, and an OFDM signal, where n represents an integer, and wherein an input signal applied to the band-pass delta sigma modulator consists of a complex modulation signal offset from the incoming radio frequency signal of the reader device by $+/-\omega_o$, where $\omega_o$ represents the frequency offset from the incoming RF signal.

In an embodiment, the tag antenna apparatus may comprise part of a tag terminal electromagnetically coupled to a reader device within an RFID network or system wherein clocking of the band-pass delta sigma modulator may be driven based on a carrier signal frequency of the reader device, frf, divided by L, where L represents a positive numerical value In a further embodiment, the antenna apparatus may comprise part of a tag terminal electromagnetically coupled to a reader device within an RFID network or system wherein generation of data from the IQ up-conversion modulator is driven by a clock circuit internal to the tag terminal.

In an alternative embodiment, the antenna apparatus may comprise part of a tag terminal electromagnetically coupled to a reader device within an RFID network or system wherein generation of data from the IQ up-conversion modulator is driven by a clock circuit based on the carrier signal frequency of the reader device, frf, divided by M, where M represents a positive numerical value.

In one embodiment, the output of the band-pass delta sigma modulator 302 may be a return to zero (RTZ), so if the data is 1101101, the output would be 10100010100010; note there is a zero between each bit. In an alternate embodiment, the output of band-pass delta sigma modulator 302 may be a non-return to zero (NRZ) type signal; for example, if the data is 1101101, the output is 1101101, and nothing is added to the data stream.

Figure 4:
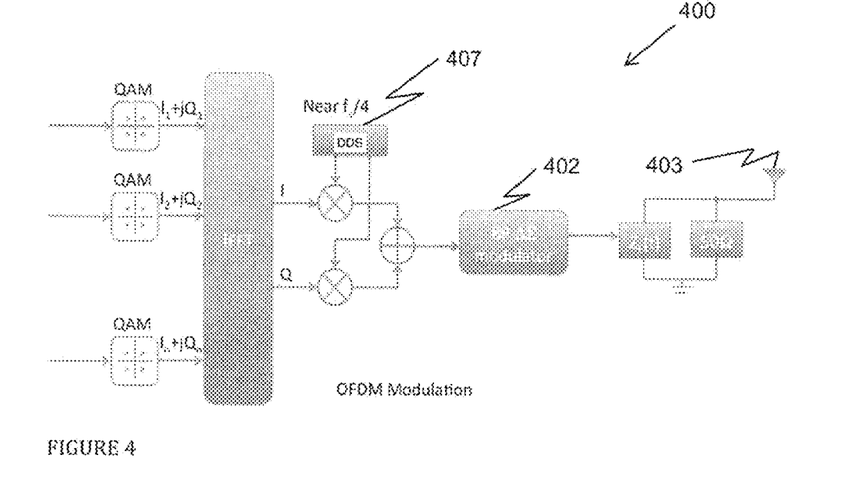
FIG. 4 shows, in one embodiment, an apparatus for generating an OFDM signal offset by the frequency of a digital signal source such as a Direct Digital Synthesizer.

FIG. 4 shows, in one embodiment, apparatus for $\Gamma$-$\Delta\Sigma$ scheme 400 for generating an orthogonal frequency division multiplexing (OFDM) signal offset by the frequency of a digital signal source such as DDS 407. The input signal to the mixers is up-converted by direct digital synthesizer (DDS) 307, or a clock, at fs/4. The signals are then applied to band pass delta sigma modulator 402. Band-pass delta sigma ($\Delta\Sigma$) modulator 402 is applied at a sampling rate fs to generate the complex modulation signal.

Figure 5:
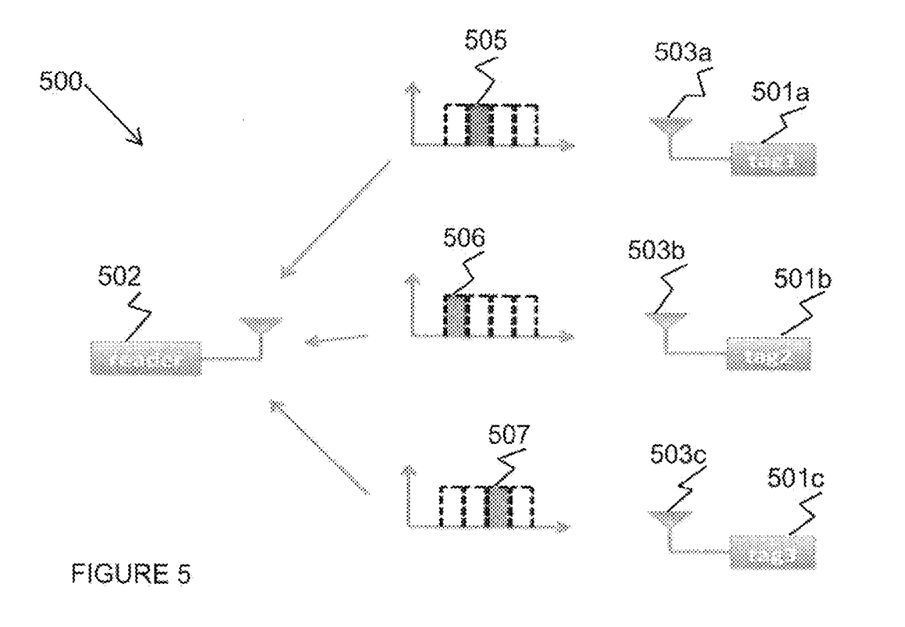
FIG. 5 shows an embodiment of an RFID system in which data transmission, via backscatter from tag to reader, is performed on dedicated frequency channels.

FIG. 5 shows an embodiment of an RFID communication network 500 in which data transmission, via backscatter from tag to reader, may be performed on dedicated frequency channels using the complex modulation apparatus and method of the $\Gamma$-$\Delta\Sigma$ scheme for band-pass delta sigma modulation. Unique, or dedicated, channels 505, 506, 507 may be generated for respective ones of tags 501a-c used in RFID communication network 500. The generated channels are located near the frequency frf+/−fs/4, where again frf represents the frequency of the carrier signal from the reader device. Antennas 503a-c in respective ones of tag terminals 501a-c backscatters the incoming RF signal, such as from reader device 502, in accordance with a reflection coefficient characteristic of particular to each of antennas 503a-c. A variable impedance circuit (not shown in FIG. 5) has an output electrically connected to the antenna 503a-c. A band-pass delta sigma modulator is coupled to an input of the variable impedance circuit to digitally control the output of the variable impedance circuit, such that reflection coefficient $\Gamma$ of particular ones of antennas 503a-c may be adjusted by changing the output of the variable impedance circuit.

Figure 6A:
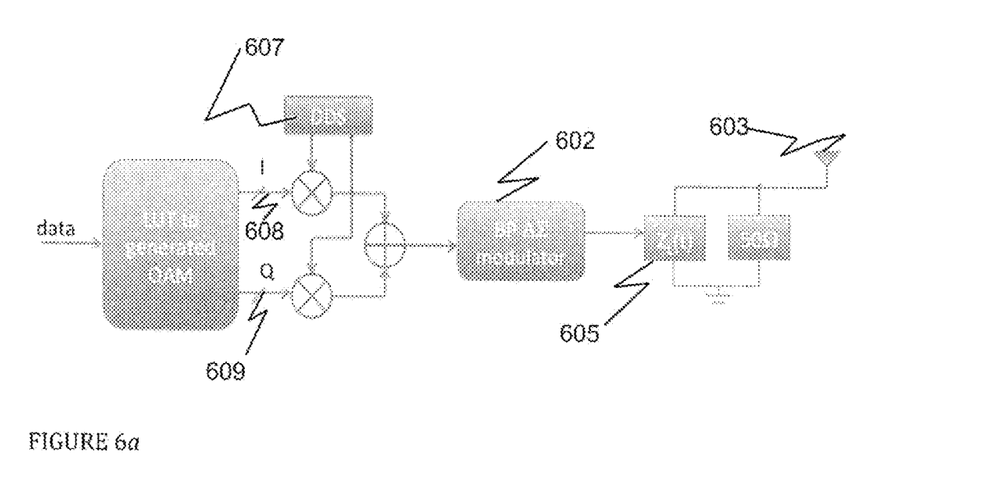
FIG. 6a shows, in one embodiment, an apparatus for generating a QAM signal.

FIG. 6a shows, in one embodiment, modulator apparatus 600A for generating quadrature amplitude (QAM) signals. Input data bits are applied to LUT (Look Up Table) 601 to generate the I and Q signals. The I and Q signals are then up-converted to fs/4 and then applied to band-pass delta sigma modulator 502 which is sampled at fs.

Figure 6B:
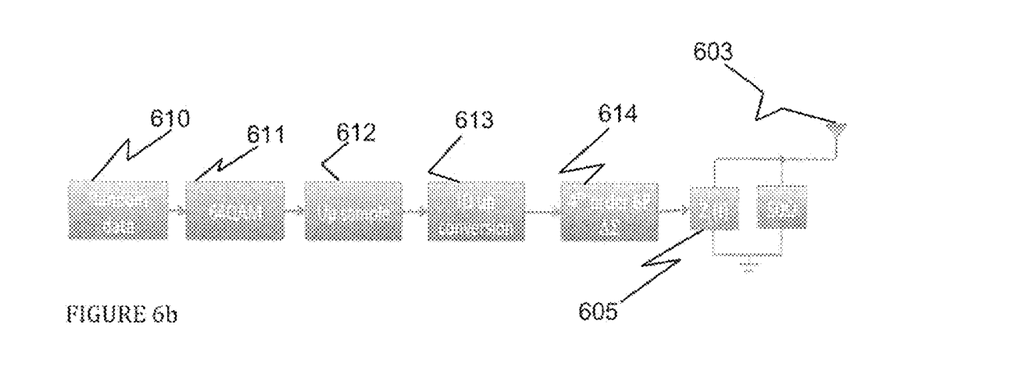
FIG. 6b shows, in one embodiment, a process for implementing of a system generating 64QAM data.

FIG. 6b shows, in one embodiment, 600B process for implementing of a system generating 64QAM data. The incoming IQ data at step 610 is used, at step 611 to generate the 64QAM data. The data is then up-sampled at step 612 and up-converted at step 613 to fs/4. A $4^{th}$ order band pass delta sigma modulator may then be applied to the signal at step 614, modulating the reflection coefficient of the particular tag antenna. The output is then demodulated by the reader and attendant output constellation diagram can be plotted for a given different level of signal-to-noise (SNR) ratio.

Figure 6C:
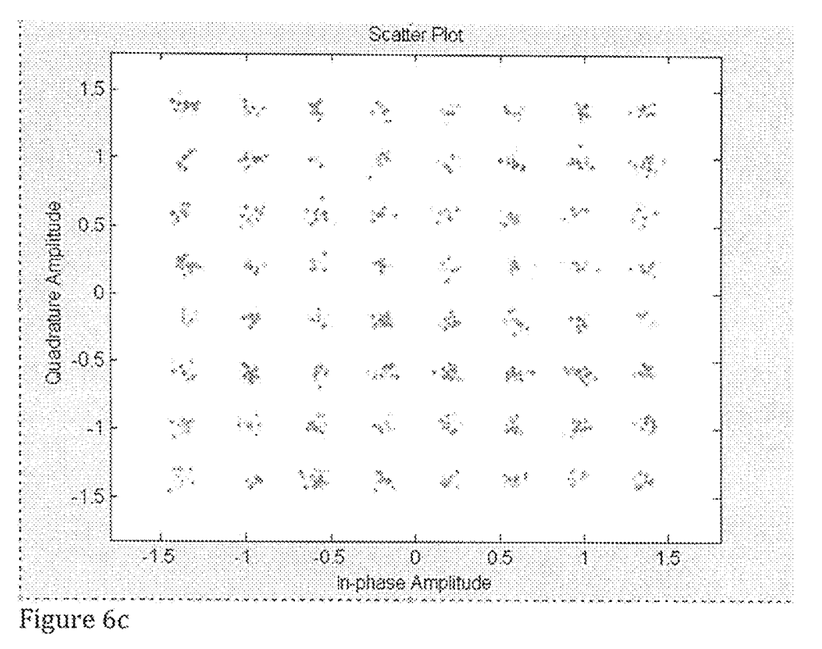
FIG. 6c shows a constellation diagram representation of the 64QAM system output with a signal to noise ratio of 13 dB.

FIG. 6c shows a constellation diagram representation of the 64QAM system output with a signal to noise ratio of 13 dB.

Figure 6D:
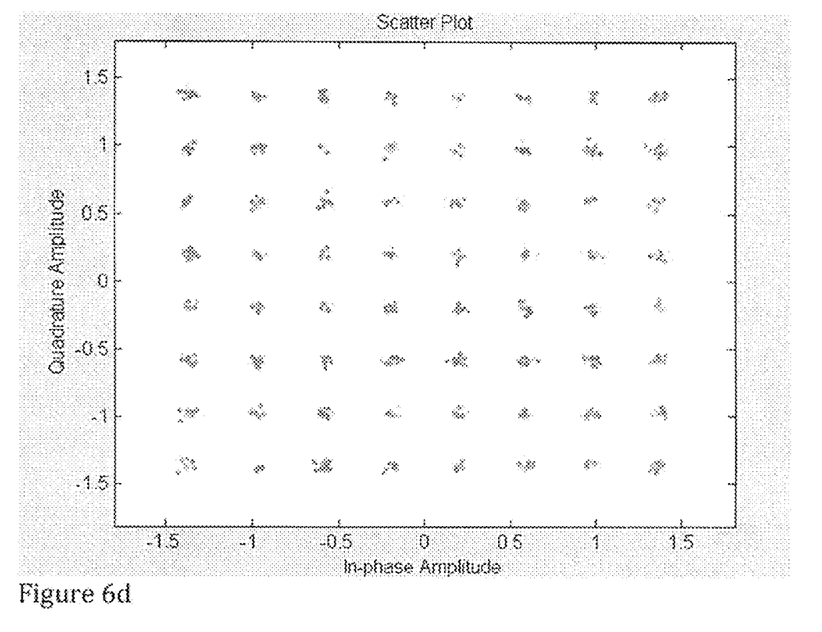
FIG. 6d shows a constellation diagram representation of the 64QAM system output with a signal to noise ratio of 22 dB.

FIG. 6d shows a constellation diagram representation of the 64QAM system output with a signal to noise ratio of 22 dB.

The constellation diagrams of FIGS. 6c and 6d show 64QAM modulation produced by applying the $\Gamma$-$\Delta\Sigma$ scheme including the band-pass delta sigma modulator. The constellation diagrams are produced by taking the output from the tag antenna, that is, what the band-pass delta sigma modulator is driving, and then passing it through a reader device. The reader device performs down-conversion using the reader device's carrier signal RF frequency, digitizing the data via an analog to digital converter (ADC), then down-sampling the data and passing it through a digital filter, and finally demodulating the IQ data. The constellation plots of FIGS. 6c and 6d shown represents the demodulated data.

With regard to the clocking function utilized by the wireless tag terminal, such as for driving the band-pass delta sigma modulator, generation of the clocking function may be provided by a clock circuit within the tag reader, or via a clock circuit generation based on the frequency of the incoming RF carrier signal provided by the reader device of the RFID network.

For example, in the instance of using the signal from the read as the clock, if the reader is at frf, the clock used by the tag will frf, or some frequency, frf/N, where N is some integer (that is frf is divided by N to generate a clock).

Figure 7A:
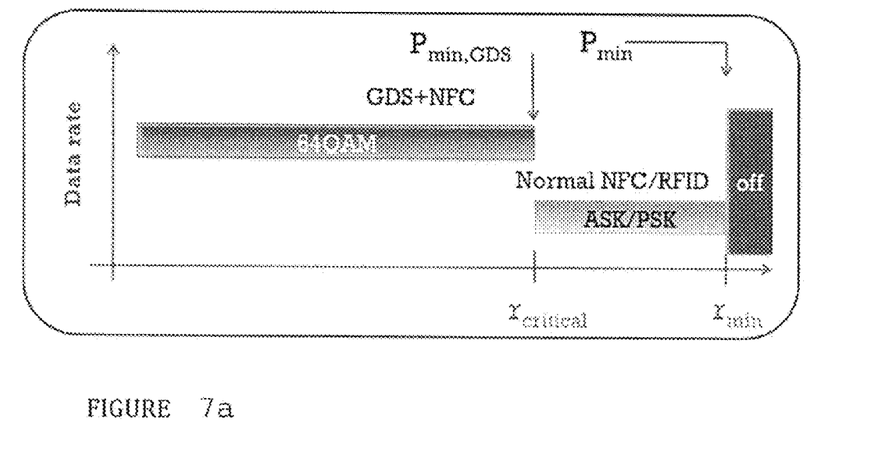
FIG. 7a shows a representation of controlling data rate versus power.

FIG. 7a shows a representation of controlling data rate versus power. A power management system may be introduced that depends on the data rate and the modulation type based on the distance between the tag and the reader, r. As the reader gets close enough (i.e. r<$r_{min}$) the tag gets enough power to turn on. From $r_{min}$ to $r_{critical}$ the tag transmits using a slow clock and ASK or PSK. As r<$r_{critical}$ the tag can start transmitting using 64QAM. For RF backscattering technology, the power received by the tag (i.e. $P_{RX}(r)$) is given by:

$$P_{RX}(r) = \left(\frac{\lambda}{4\pi r}\right)^2 P_{TX} G_{TX} G_{RX}$$

where λ is the wavelength of the carrier signal, r is the distance between the tag and the reader, $P_{TX}$ is the power of the transmitter, $G_{TX}$ is the antenna gain of the reader, and $G_{RX}$ is the antenna gain of the tag. The modulated power from the tag is then received by the reader.

Figure 7B:
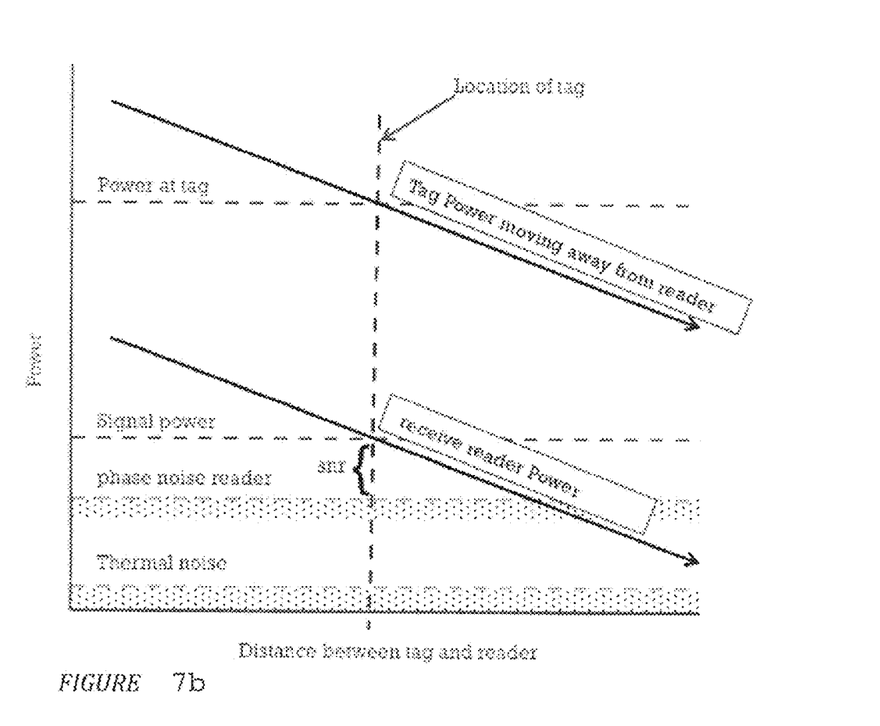
FIG. 7b shows a representation of link budget versus distance between tag and reader.

FIG. 7b shows a representation of link budget versus distance between tag and reader. The link budget between the tag and reader is shown as a function of the tag-reader distance. The power received by the tag is decreased as the tags moves further away form the reader. At some such position, the backscatter power of the tag is attenuated as it travels back to the reader. The signal to noise ratio (SNR) is given by the power received by the reader over the phase noise of the oscillator within the reader.

For example, since the power coming from the reader falls off as (1/r^2) the complex modulation technology may be applied when the reader is closer. As the reader gets further away, lower modulations can be used. It will be understood that application of the complex modulation requires a higher SNR and more power.

Although preferred embodiments of the invention have been described herein with regard to passive and semi-passive RFID communication networks, it is contemplated, and indeed it will be understood by those skilled in the art, that the solutions presented herein may be applied to other aspects of wireless communication. Accordingly, a person of ordinary skill in the art would understand that the specific embodiments described herein, while illustrative are not necessarily comprehensive. Thus, other various modifications, may be made those skilled in the art without departing from the scope of the invention as defined by the claims.

What is claimed is:

1. An antenna apparatus for backscattering an incoming radio frequency (RF) signal comprising:

an antenna for backscattering the incoming RF signal in accordance with a reflection coefficient characteristic of the antenna;
a variable impedance circuit having an output electrically connected to the antenna; and
a band-pass delta sigma (ΔΣ) modulator coupled to the variable impedance circuit and digitally controlling the output of the variable impedance circuit;
wherein the reflection coefficient (Γ) of the antenna is adjusted based on the digitally controlled output of the variable impedance circuit.

2. The antenna apparatus of claim 1, the antenna apparatus comprising part of a tag terminal electromagnetically coupled to a reader device within a radio frequency identification (RFID) system wherein clocking of the band-pass delta sigma modulator is generated via a clock circuit within the tag terminal.

3. The antenna apparatus of claim 1, the antenna apparatus comprising part of a tag terminal electromagnetically coupled to a reader device within a radio frequency identification (RFID) system wherein clocking of the band-pass delta sigma modulator is generated based on a carrier signal frequency of the reader device, frf, divided by L, where L represents a positive numerical value.

4. The antenna apparatus of claim 3 wherein the complex modulation signal consists of one of a GMSK, QPSK, nPSK, nQAM, and an OFDM signal.

5. The antenna apparatus of claim 1 wherein an output of the band-pass delta sigma modulator switches the output of the variable impedance circuit between two states to adjust the reflection coefficient.

6. The antenna apparatus of claim 1, the antenna apparatus comprising part of a tag terminal electromagnetically coupled to a reader device within a radio frequency identification (RFID) system, wherein an input signal applied to the band-pass delta sigma modulator consists of a complex modulation signal offset from an incoming RF signal from the reader device by +/−$\omega_o$, where $\omega_o$ represents a frequency offset from the incoming RF signal.

7. The antenna apparatus of claim 1 wherein an output of the band-pass delta sigma modulator is one of a return to zero (RTZ) and a non-return to zero (NRZ) type signal.

8. The antenna apparatus of claim 1 wherein the digitally controlled output is generated from an in-phase-quadrature (IQ) up-converted signal input to the band-pass delta sigma modulator.

9. The antenna apparatus of claim 8, the antenna apparatus comprising part of a tag terminal electromagnetically coupled to a reader device within a radio frequency identification (RFID) system wherein generation of data from the IQ up-conversion modulator is based on a clock circuit internal to the tag terminal.

10. The antenna apparatus of claim 8, the antenna apparatus comprising part of a tag terminal electromagnetically coupled to a reader device within a radio frequency identification (RFID) system wherein generation of data from the IQ up-conversion modulator is based on a clock circuit using a carrier signal frequency of the reader device, frf, divided by M, where M represents a positive numerical value.

11. The antenna apparatus of claim 8 wherein the up-conversion modulator up converts data around fs divided by 4, where fs is the sampling frequency of the band-pass delta sigma modulator.

12. The antenna apparatus of claim 8 wherein data input to the IQ up-conversion modulator is unsampled.

13. The antenna apparatus of claim 8 wherein input data provided to the up-conversion module consists of one of a GMSK, QPSK, nPSK, nQAM, and an OFDM signal format.

14. The antenna apparatus of claim 1 further comprising at least one filter device at the variable impedance circuit to filter out of band noise output from the band-pass delta sigma modulator.

15. The antenna apparatus of claim 1 wherein the antenna apparatus is included in a tag terminal of a radio frequency identification (RFID) system comprising a reader device, wherein the antenna apparatus is activated for backscattering RF signals only when the tag terminal is within a predetermined critical distance of the reader device.

* * * * *